United States Patent [19]
Way

[11] 3,865,399
[45] Feb. 11, 1975

[54] AUXILIARY FOLDABLE STEP STRUCTURE

[76] Inventor: Lee V. Way, Rt. 3, Box 333C, Wilmington, N.C. 28401

[22] Filed: Oct. 23, 1973

[21] Appl. No.: 408,497

[52] U.S. Cl. ............................................. 280/166
[51] Int. Cl. ............................................. B60w 3/02
[58] Field of Search ............ 280/166, 163; 296/62; 182/156; 105/447

[56] References Cited
UNITED STATES PATENTS
1,953,298  4/1934  Goodwin............................. 105/447
3,330,577  7/1967  Mills................................... 280/166
3,392,990  7/1968  Wolf................................... 280/163
3,462,170  8/1969  Smith.................................. 280/166
3,606,382  9/1971  Pollock............................... 296/62

*Primary Examiner*—Robert R. Song

[57] ABSTRACT

An auxiliary foldable step structure provides an auxiliary step hinge mounted to a support plate which can be secured to the tailgate of a pickup truck. When the tailgate is closed, the auxiliary step nests in the support plate.

4 Claims, 8 Drawing Figures

PATENTED FEB 11 1975
3,865,399
SHEET 1 OF 2
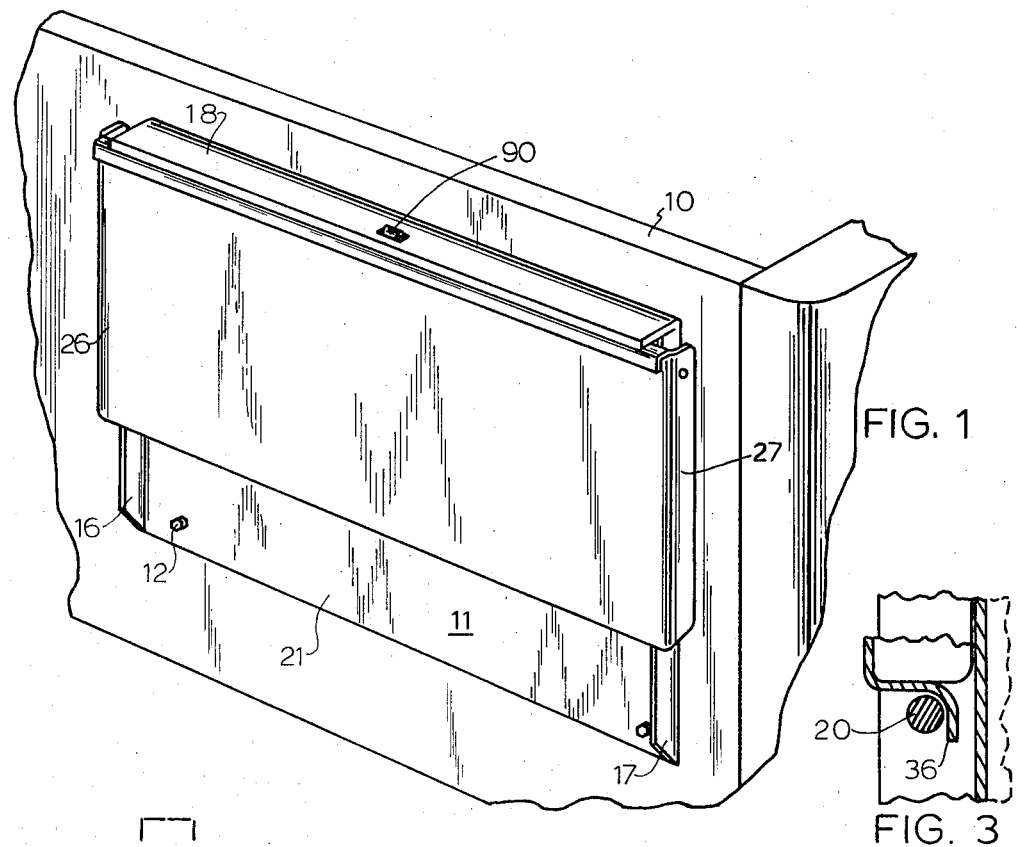
FIG. 1
FIG. 3
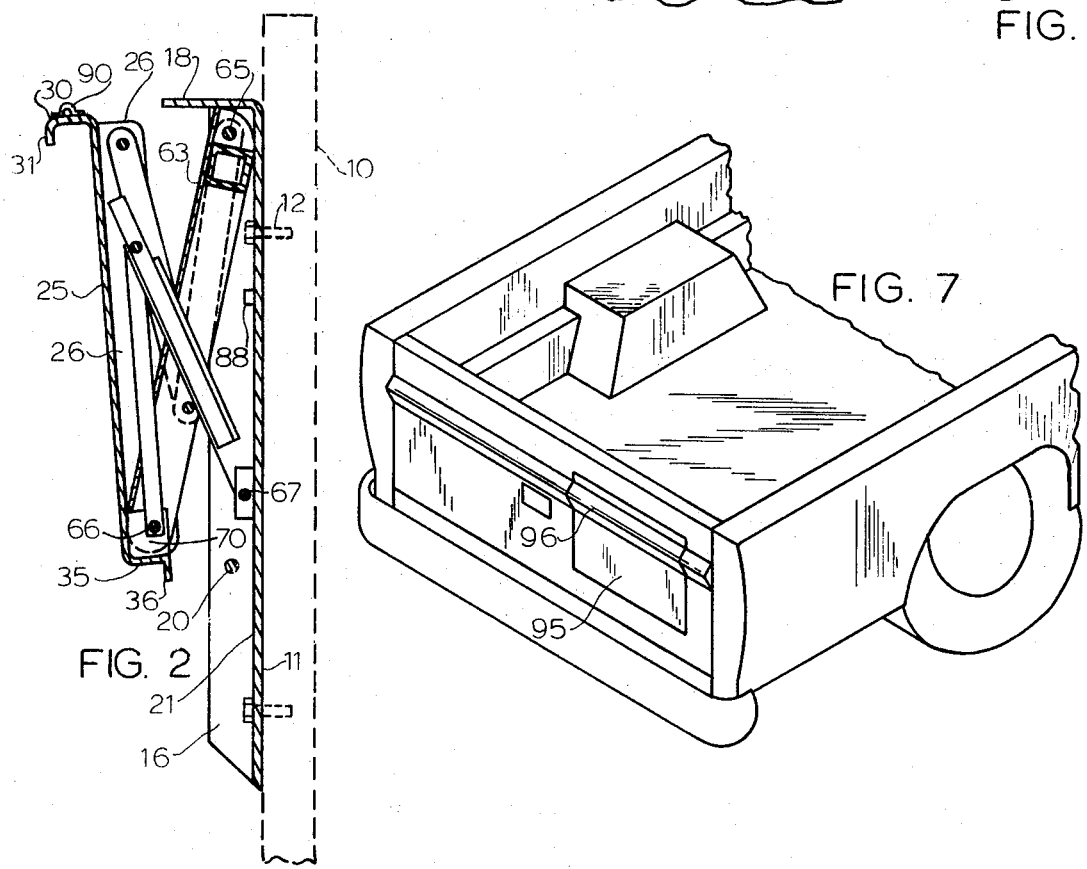
FIG. 2
FIG. 7

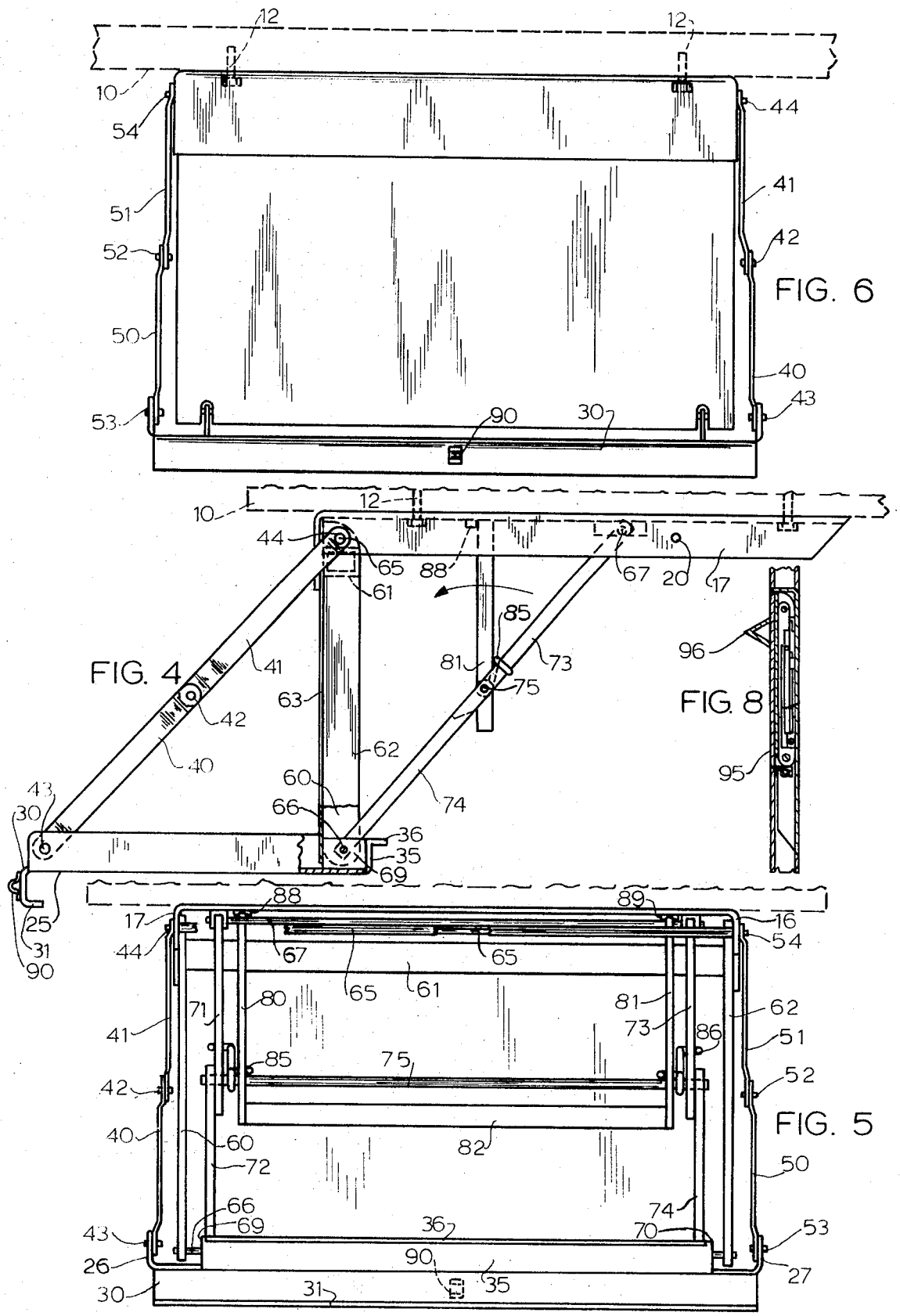

3,865,399

AUXILIARY FOLDABLE STEP STRUCTURE

BACKGROUND OF THE INVENTION

1. Field of the Invention

This invention relates to foldable auxiliary step structures adapted to be fixed onto the tailgate of a pickup truck, and the like.

2. Description of the Prior Art

A variety of auxiliary foldable steps has been proposed for various kinds of vehicles. An early U.S. Pat. No. 1,223,639 teaches a folding pedestal which can be secured to a wagon endgate and wagon frame. However, the structure taught in this patent does not provide for positive locking with a stiff arm when in an open position or for nesting the pedestal when in a closed position to give a neat appearance. The structure of this patent is furthermore not readily adapted to being attached to the tailgate found on modern pickup trucks. A later U.S. Pat. No. 2,462,170 teaches a set of folding steps which can be attached to a conventional pick-up truck tailgate but which does not provide for nesting and hiding the steps when not being used. A further U.S. Pat. No. 3,606,382 teaches a folding step which is secured both to the truck frame and the truck tailgate and which, again, lacks any kind of stiff arm for use when open or any kind of nesting arrangement for hiding the step during periods of non-use.

Another approach has been to attach an auxiliary step to a bumper, and this is illustrated in U.S. Pat. No. 3,507,515 which provides an improved appearance but still fails to provide the concept of nesting the auxiliary step. Other patents which may be referred to, to illustrate the state of the art, includes U.S. Pat. Nos. 560,752, 1,760,422, 3,330,577 and 3,488,066.

It is believed that the foregoing represents a reasonably accurate picture of the prior art from which it can be seen that the prior art has not provided an auxiliary step apparatus specifically designed to be braced by a stiff arm when open and to be nested when inactive so as to preserve an attractive appearance.

SUMMARY OF THE INVENTION

An auxiliary folding step apparatus according to the invention incorporates a support plate which is adapted to be secured to the tailgate of a pickup truck and which also provides a base against which a folding step hinged to the base plate can be nested.

An auxiliary step is connected by a plurality of pivotal links to the base plate. When the pickup truck tailgate is lowered to its horizontal position, the auxiliary step can be unlatched from a locked, nested position to assume a horizontal position as a step. Additional links are provided for locking the step in its operating position in a stiff arm type arrangement. When the tailgate is returned to its vertical position for travel, the auxiliary step can be folded back, nested, and locked into an attractive position immediately next to the base plate. While primarily intended to be attached to existing pickup truck tailgates, the auxiliary step apparatus of the invention lends itself to being built into the tailgate structure at the factory and with an appended exterior panel designed to blend the auxiliary step apparatus into the exterior tailgate appearance.

DESCRIPTION OF THE DRAWINGS

FIG. 1 is a partially cutaway perspective drawing showing the auxiliary step apparatus of the invention as it appears when closed and nested in an inoperative position.

FIG. 2 is a cross-sectional view through the invention apparatus and showing the auxiliary step partially open with the tailgate being represented in dashed lines.

FIG. 3 is a partially enlarged cutaway section view illustrating a curved edge of the folding step in a locked position around a fixed rod mounted in the base plate.

FIG. 4 is a side view which illustrates the auxiliary step in an operative position and shows the pickup truck tailgate in dashed lines.

FIG. 5 is a rear view of the auxiliary step apparatus in an operative position with the tailgate indicated in dashed lines.

FIG. 6 is a front view of the auxiliary step apparatus in an operative position and with the tailgate shown in dashed lines.

FIG. 7 is a perspective view of an alternative embodiment in which the auxiliary step apparatus of the invention is built into the tailgate.

FIG. 8 is a cross section taken through the embodiment shown in FIG. 7.

DESCRIPTION OF THE PREFERRED EMBODIMENT

Referring to the drawings, the auxiliary step apparatus of the invention is preferably formed of heavy gauge metal and is intended to be secured to the back of a pickup truck tailgate 10 by means of a base plate 11. Base plate 11 is secured to the outer surface of tailgate 10 by a plurality of bolts 12 or other suitable fastening means. Base plate 11 includes perpendicularly and outwardly oriented side edges 16, 17 and a perpendicularly and outwardly oriented top edge 18. A fixed rod 20 extends between the side edges 16, 17 and slightly in front of the front surface 21 of base plate 11. Rod 20 helps lock the assembly.

A step plate 25 has perpendicularly and outwardly oriented side edges 26, 27 and, as shown in FIG. 2, an outwardly turned, perpendicularly oriented top edge 30 with a downwardly turned lip 31 and further includes a bottom edge 35 with a downwardly turned lip 36. Step plate 25 is supported on one side from base plate 11 by a pivotal pair of links 40, 41 having a connecting pin 42 and having a pivotal joint 43 on step plate 25 and a pivotal connection 44 on an outer end of rod 65 which is supported on edges 16, 17 of base plate 11 and extends across base plate 11. On the opposite side there are provided pivotal links 50, 51 having a connecting pin 52, a pivotal connection 53 to step plate 25, and a pivotal connection 54 on an opposite end of rod 65.

A riser plate 63 is reinforced by a bar arrangement made up of bars 60, 61 and 62 which are welded to the back of riser plate 63 to form an integral structure. Riser plate 63 and base plate 11 are pivotally connected by rod 65 while riser plate 63 and step plate 25 are pivotally connected on rod 66 which extends through one end of bars 60, 62. Rod 66 is also supported on inwardly turned flanges 69, 70 which are appended to edge 35 of step plate 25 as indicated in FIGS. 4 and 5.

In order to lock the step plate into open position, there is provided on one side of the riser plate a set of links 71, 72 and on the opposite side a corresponding set of links 73, 74. Links 72, 74 pivot on rod 66 and links 71, 73 pivot on another rod 67 supported on base plate 11. A central pivot for links 71, 72 is provided by an additional rod 75 which also provides a central pivot for corresponding links 73, 74. A U-shaped stiff arm is provided by the structure which includes arms 80, 81 and connector bar 82. This structure pivots on rod 75 and includes on each side suitable wire springs 85 of FIGS. 4 and 5 which tends to move arms 80, 81 in the direction indicated by the arrow in FIG. 4. Suitable stops 88, 89 are provided on base plate 11. As best indicated in FIG. 4, arms 80, 81, when used as a stiff arm, move against the stops 88, 89 and cause the respective links 71, 72 and 73, 74 to be held rigid which holds step plate 25 in a fixed open position for use as an auxiliary step.

For folding and nesting, the operator manually moves the stiff arms 80, 81 against the tension of the springs 85, 86 which allows the respective links 71, 72 and 73, 74 to be folded inwardly. This, in turn, allows the links 40, 41 and 50, 51 to be folded. The tailgate 10 is placed in a vertical position and the assembly is nested by bringing the lip 36 around the rod 20, as best seen in FIG. 3, after which the top edge 30 is nested beneath the base plate edge 18 and the assembly is latched by a suitable latching means indicated at 90. Latch 90 may be a deadbolt type lock or any suitable spring type latch well known in the art.

While the primary purpose of the invention is that of providing an auxiliary step which can be attached without requiring modification of the tailgate itself, FIGS. 7 and 8 illustrate how the invention apparatus may be adapted as a built-in feature. For this embodiment, a suitable cavity or well is designed into the tailgate structure during manufacture of the truck. The invention apparatus previously explained is then simply fitted into this well and an appropriate plate 95 having an appropriate trim 96, or the like, is secured to what, in folded position, constitutes the outer surface of step plate 25. In all other respects, the invention apparatus may be built and operated in the manner previously explained.

What is claimed is:

1. An auxiliary foldable step for a vehicle having a tailgate movable from a vertical traveling position to a horizontal loading position comprising, in combination:
   a. a rectangular base plate adapted to be rigidly secured to the outer surface of a tailgate with the respective top and bottom long edges thereof disposed generally parallel, said base plate having secured thereto a pair of stiff arm stops;
   b. a rectangular riser plate having its top long edge positioned immediately adjacent and pivotally secured to the top long edge of said base plate for pivoting on a first lengthwise extending axis;
   c. a rectangular step plate having its rearward long edge positioned adjacent and pivotally secured to the bottom long edge of said riser plate for pivoting on a second lengthwise extending axis;
   d. a first double pair of links, each pair having a common central pivotal connection, one of the links in each pair having a first end pivotal connection to and proximate a respective outer corner of said step plate and the other of the links in each pair having a second end pivotal connection proximate a respective top corner of said base plate for pivoting on said first axis;
   e. a second double pair of links, each second pair having a common central pivotal connection, one link of each such second pair having first end pivotal connections to said riser plate and step plate for pivoting on said second axis and the other link of each said second pair having a second end pivotal connection on an end of said base plate and intermediate the width thereof for pivoting on a third axis; and
   f. a pair of stiff arms having respective ends secured for pivoting around the respective central pivot connections of each said second pair of links and swingable to a locked position to engage said stops on said base plate and to lock said second and first pairs of links into a fixed operative position to secure said step.

2. An auxiliary step as claimed in claim 1 wherein said first and second axis coincide with the axis of respective pivot rods mounted thereat and said respective pivoting is around the axis of said rods.

3. An auxiliary step as claimed in claim 1 wherein said base and step plates include respective top perpendicularly and outwardly extending locking edges and formed such that when said riser and step plates are closed against said base plate said step plate perpendicular locking edges resides immediately adjacent and below said base plate perpendicular locking edge enabling a smooth nesting appearance and enabling said perpendicular locking edges to be locked to secure said step in transit.

4. An auxiliary step as claimed in claim 1 wherein said step plate includes a bottom locking edge extending the length thereof and parallel to and offset from the plane of said step plate, said base plate mounts a locking rod extending the length thereof and positioned such that said step plate locking edge may engage said locking rod simultaneously with the nesting of said base and step plate locking edges.

* * * * *